(12) United States Patent
Nakamura

(10) Patent No.: US 12,287,118 B2
(45) Date of Patent: Apr. 29, 2025

(54) AIR-CONDITIONING PANEL

(71) Applicant: YAZAKI ENERGY SYSTEM CORPORATION, Tokyo (JP)

(72) Inventor: Takuju Nakamura, Hamamatsu (JP)

(73) Assignee: YAZAKI ENERGY SYSTEM CORPORATION, Tokyo (JP)

( * ) Notice: Subject to any disclaimer, the term of this patent is extended or adjusted under 35 U.S.C. 154(b) by 18 days.

(21) Appl. No.: 18/473,201

(22) Filed: Sep. 22, 2023

(65) Prior Publication Data
US 2024/0011649 A1    Jan. 11, 2024

Related U.S. Application Data

(63) Continuation of application No. PCT/JP2022/014718, filed on Mar. 25, 2022.

(30) Foreign Application Priority Data

Apr. 28, 2021 (JP) .................................. 2021-076053

(51) Int. Cl.
F24F 5/00    (2006.01)
(52) U.S. Cl.
CPC ................................. F24F 5/0014 (2013.01)
(58) Field of Classification Search
CPC .................. F24F 5/0014; F24F 5/0021; F24F 2005/0064; F25B 17/08; Y02B 30/62
USPC ........................................................ 62/486
See application file for complete search history.

(56) References Cited

U.S. PATENT DOCUMENTS

| 2018/0224158 A1* | 8/2018 | Plesniak | ............... F24S 80/453 |
| 2019/0219340 A1* | 7/2019 | De Jong | ............... F28D 20/003 |
| 2020/0182486 A1* | 6/2020 | Haynes | ................... F24D 5/005 |

FOREIGN PATENT DOCUMENTS

| JP | 6552425 B2 | 7/2019 |
| JP | 6683861 B2 | 4/2020 |

OTHER PUBLICATIONS

International Search Report and Written Opinion of the International Search Report for PCT/JP2022/014718 dated May 10, 2022.

* cited by examiner

*Primary Examiner* — Steve S Tanenbaum
(74) *Attorney, Agent, or Firm* — KENEALY VAIDYA LLP

(57) ABSTRACT

An air-conditioning panel includes: a regenerative absorber having an absorbent liquid that absorbs a vapor refrigerant or an adsorbent agent that adsorbs the vapor refrigerant and discharging the vapor refrigerant absorbed by heating with sunlight; a condenser configured to liquefy the vapor refrigerant discharged from the regenerative absorber into a liquid refrigerant; and an evaporator configured to evaporate the liquid refrigerant from the condenser. The regenerative absorber and the condenser are formed on one surface side of the panel exposed to sunlight. The evaporator is formed on the other surface side of the panel. A first portion of the panel corresponding to the regenerative absorber is processed to have a solar absorptivity of 80% or more and a far-infrared emissivity of 80% or more. A second portion of the panel corresponding to the condenser is processed to have a solar reflectance of 80% or more.

5 Claims, 3 Drawing Sheets

AIR-CONDITIONING PANEL

CROSS-REFERENCE TO RELATED APPLICATIONS

This is a continuation of International Application No. PCT/JP2022/014718 filed on Mar. 25, 2022, and claims priority from Japanese Patent Application No. 2021-076053 filed on Apr. 28, 2021, the entire content of which is incorporated herein by reference.

TECHNICAL FIELD

The present invention relates to an air-conditioning panel.

BACKGROUND ART

In the related art, there is proposed an absorption type refrigeration panel in which an absorption type refrigeration machine is formed in a panel shape (refer to, for example, JP6552425B and JP6683861B). This absorption type refrigeration panel has an absorber and a condenser formed on one surface side of the panel, and an evaporator formed on the other surface side thereof. Since such an adsorption type refrigeration panel is formed in the panel shape, the same can be used as a building material of a wall or a ceiling, thereby making it possible to be used as a building material having an air-conditioning function.

When solar heat is used as an energy source in such an adsorption type refrigeration panel, it is conceivable to provide a heat collection regenerator on the panel surface. In this case, the heat collection regenerator required to be exposed to sunlight is desirably formed in the vicinity of one surface of the panel or the other surface thereof. Further, it is preferable to provide an evaporator for obtaining an air-conditioning effect and a condenser required to discard condensation heat in the vicinity of the surface of the panel. In addition, since it is necessary to provide an absorber, it becomes difficult to dispose those devices in a limited area, and as such a configuration becomes complicated and sufficient performance cannot be achieved.

Particularly, when the adsorption type refrigeration panel is used as a building material, the heat collection regenerator is disposed on one surface side exposed to sunlight, and the evaporator is disposed on the other surface side facing the room. In this case, it is preferable that the condenser is not heated. When the condenser is provided on the other surface side as in the case of the evaporator, condensation heat is discarded indoors and the area of the evaporator is reduced, so that it is difficult to obtain a sufficient air-conditioning effect. Accordingly, it is difficult to say that sufficient performance is exhibited. On the other hand, when the condenser is provided on the heat collection regenerator side, the condenser is also exposed to sunlight, which causes deterioration in condensation efficiency. In this case as well, it is difficult to say that sufficient performance is exhibited.

SUMMARY OF INVENTION

The present disclosure has been made to solve the above-described problems, and an object thereof is to provide an air-conditioning panel capable of not only solving a problem related to area occupancy but also exhibiting more sufficient performance.

An air-conditioning panel according to the present disclosure is an air-conditioning panel formed in a panel shape and configured to obtain an air-conditioning effect, and the air-conditioning panel includes: a regenerative absorber having an absorbent liquid that absorbs a vapor refrigerant or an adsorbent agent that adsorbs the vapor refrigerant, in which the regenerative absorber discharges the vapor refrigerant absorbed or adsorbed by heating with sunlight; a condenser configured to liquefy the vapor refrigerant discharged from the regenerative absorber into a liquid refrigerant; and an evaporator configured to evaporate the liquid refrigerant from the condenser. The regenerative absorber and the condenser are formed on one surface side of the panel, in which the one surface side is a side being exposed to sunlight. The evaporator is formed on the other surface side of the panel, in which the other surface side is opposite the one surface side of the panel. A first portion on the one surface side of the panel, the first portion corresponding to the regenerative absorber, is subjected to processing so as to have a solar absorptivity of 80% or more and a far-infrared emissivity of 80% or more. A second portion on the one surface side of the panel, the second portion corresponding to the condenser, is subjected to processing so as to have a solar reflectance of 80% or more.

According to the present disclosure, it is possible to provide an air-conditioning panel capable of not only solving a problem related to area occupancy but also exhibiting more sufficient performance.

BRIEF DESCRIPTION OF DRAWINGS

FIG. 1A shows a perspective state of one surface side, and FIG. 1B shows a perspective state of the other surface side.

FIG. 2A shows a perspective view, and FIG. 2B shows a side view.

FIG. 3A shows a perspective view, and FIG. 3B shows a side view.

DESCRIPTION OF EMBODIMENTS

The present disclosure will be described below with exemplary embodiments. It is noted that the present disclosure is not limited to the embodiments described below, and can be modified as appropriate without departing from the gist of the present disclosure. In addition, in the embodiments described below, illustration of some configurations and description thereof may be omitted, and it goes without saying that, regarding the details of the omitted techniques, public or well-known techniques are appropriately applied within the scope that does not cause contradiction with the contents described below.

Figure 1A:
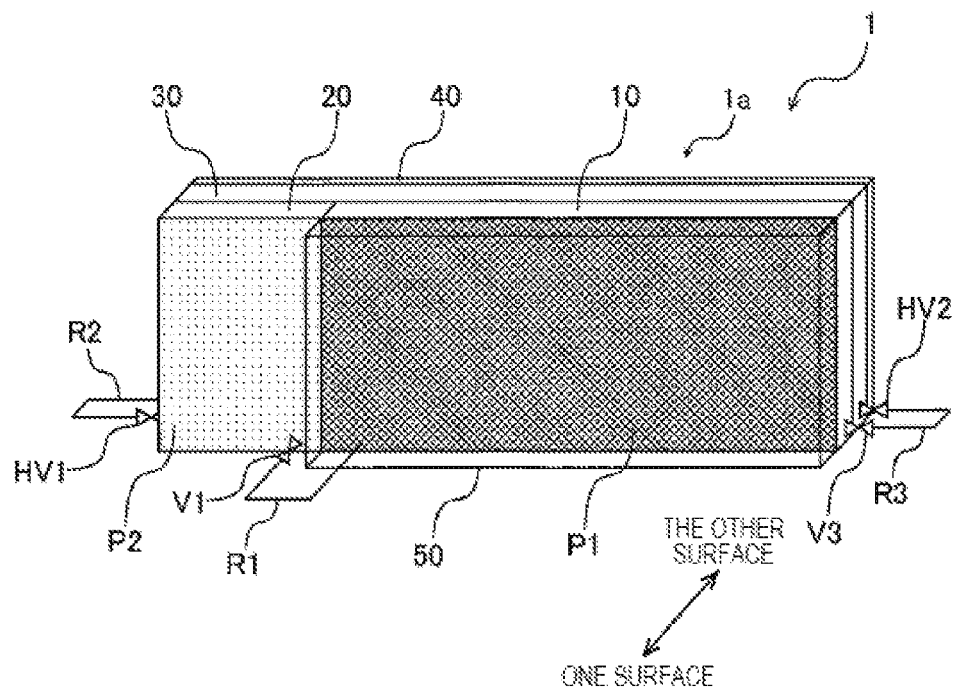
FIGS. 1A and 1B are perspective views showing an air-conditioning panel according to an embodiment.
Figure 1B:
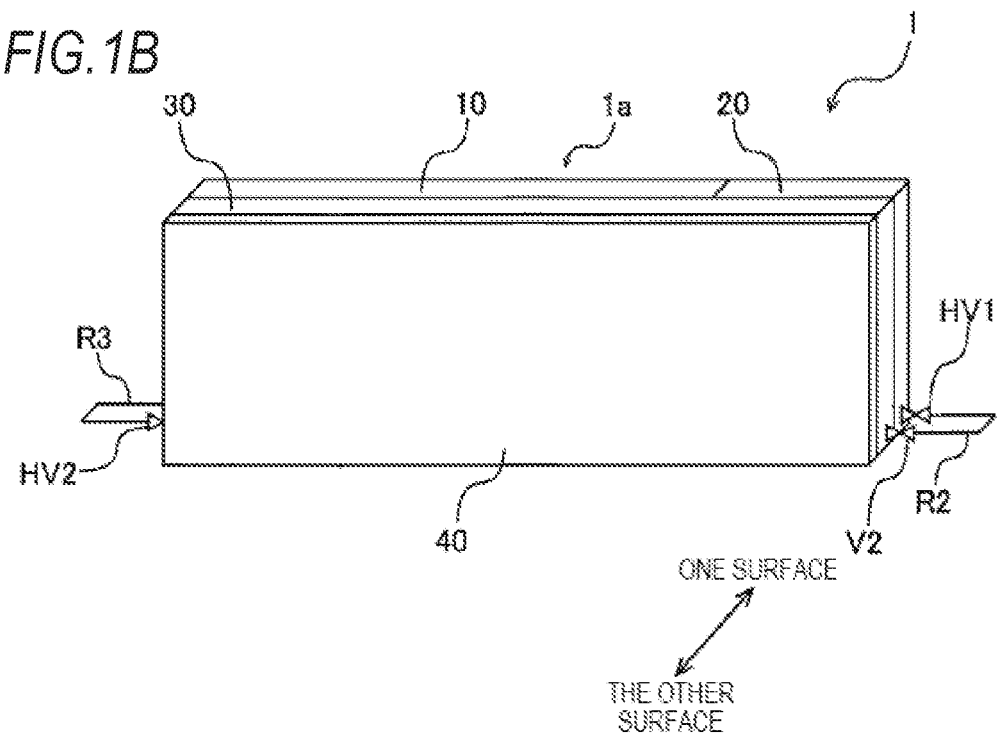

FIGS. 1A and 1B are perspective views showing an air-conditioning panel according to an embodiment, FIG. 1A shows a perspective state of one surface side, and FIG. 1B shows a perspective state of the other surface side. Although FIGS. 1A and 1B show an example in which the air-conditioning panel is used on a vertical surface, the air-conditioning panel may be used on an inclined surface or a horizontal surface.

An air-conditioning panel 1 according to the example shown in FIGS. 1A and 1B is formed by bending and welding a plate material, and appearance thereof is a substantially panel shape. The air-conditioning panel 1 is formed of a regenerative absorber 10, a condenser 20, an evaporator 30, a latent heat storage material 40, a heat insulating cover 50, various flow paths R1 to R3, various valves V1 to V3 and HV1 and HV2.

The regenerative absorber 10 is provided on one surface side of the panel exposed to sunlight, and includes at least one of an absorbent liquid (for example, lithium bromide) that absorbs a vapor refrigerant (for example, water vapor) or an adsorbent agent (for example, silica gel) that adsorbs a vapor refrigerant. The regenerative absorber 10 includes the absorbent liquid or the adsorbent agent, thereby functioning as an absorber that absorbs a vapor refrigerant.

In addition, the regenerative absorber 10 is heated to, for example, around 100° C. or higher by exposing one surface side of the panel to sunlight during the day, and discharges the absorbed or adsorbed vapor refrigerant. Therefore, the regenerative absorber 10 functions as a regenerator that discharges a vapor refrigerant by exposing one surface side of the panel to sunlight.

Here, in the present embodiment, a first portion P1 on one surface side of the panel corresponding to the regenerative absorber 10 is subjected to processing so as to have a solar absorptivity of 80% or more. Due to such processing, the regenerative absorber 10 is exposed to sunlight during the day and heated to about 100° C. or higher. Further, the first portion P1 is subjected to processing so as to have a far-infrared emissivity of 80% or more. Such processing enables the regenerative absorber 10 to discard absorbed heat during the night. An example of the processing capable of achieving both the solar absorptivity of 80% or more and the far-infrared emissivity of 80% or more includes black enamel processing, and in the present embodiment, the black enamel processing is applied to the first portion P1.

The first vapor refrigerant flow path R1 is a flow path that connects the regenerative absorber 10 to the condenser 20. In the example shown in FIG. 1A, the first vapor refrigerant flow path R1 is provided so as to be exposed to the outside from a panel-shaped main body portion 1a, but is not limited thereto. The first vapor refrigerant flow path R1 may be housed and provided in the main body portion 1a.

Figure 2A:
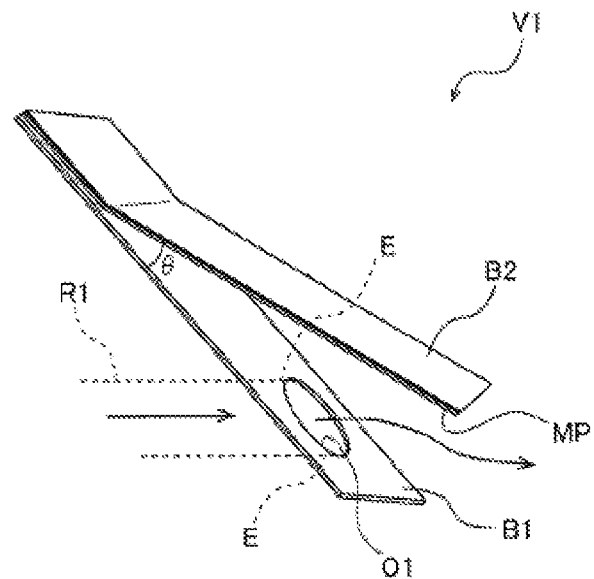
FIGS. 2A and 2B are configuration diagrams showing details of a first check valve shown in FIG. 1A.
Figure 2B:
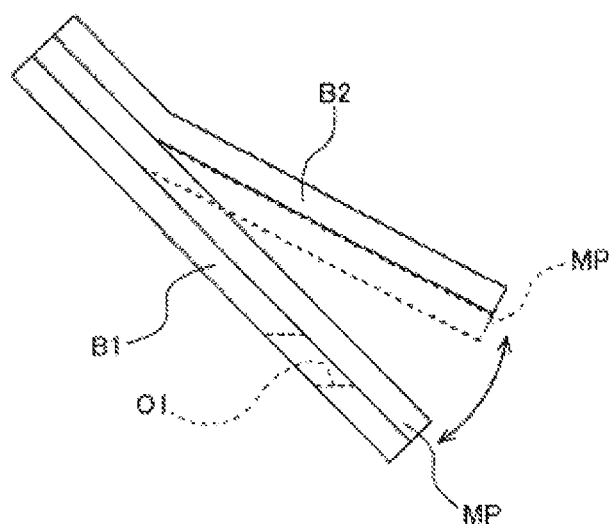

The first check valve V1 is provided in the first vapor refrigerant flow path R1, and prevents a liquid refrigerant (such as water) or a vapor refrigerant (such as water vapor) from flowing backwards from the condenser 20 into the regenerative absorber 10. FIGS. 2A and 2B are configuration diagrams showing the details of the first check valve V1 shown in FIG. 1A, FIG. 2A shows a perspective view, and FIG. 2B shows a side view. In addition, in FIG. 2B, for the sake of illustration, a plate material is illustrated to be thicker than that of FIG. 2A.

As shown in FIG. 2A, the first check valve V1 is provided, for example, so as to be able to open and close a terminal end E (downstream end) of the first vapor refrigerant flow path R1, and includes two base materials B1 and B2 and an operation plate MP.

The two base materials B1 and B2 are plate materials in a state of being separated from each other by rotation at an angle θ. In the two base materials B1 and B2, the first base material B1 is formed with an opening O1 having a size corresponding to the diameter of the first vapor refrigerant flow path R1, and the opening O1 is in a state of being connected to the terminal end E of the first vapor refrigerant flow path R1. The second base material B2 is a plate material without an opening. It is noted that the second base material B2 may have an opening or the like.

The operation plate MP is a plate material in a state of contacting the first base material B1 and closing the opening O1 of the first base material B1 in its basic state. When the regenerative absorber 10 is heated during the day, pressure in the regenerative absorber 10 is increased by discharge of a vapor refrigerant, which causes a pressure difference between the regenerative absorber 10 and the condenser 20. At this time, the operation plate MP is separated from the first base material B1 by the pressure difference therebetween and rotated (contacts) toward the second base material B2. As a result, the first check valve V1 is in an open state during the day. On the other hand, at night, the regenerative absorber 10 is not heated and the pressure difference does not occur. Therefore, the first check valve V1 is in a closed state. That is, the first check valve V1 has a function of preventing a liquid refrigerant in the condenser 20 from flowing back into the regenerative absorber 10 in the evening and at night or preventing the liquid refrigerant from being vaporized and flowing back thereinto to be absorbed again by the absorbent liquid or the adsorbent agent.

The condenser 20 introduces a vapor refrigerant from the regenerative absorber 10 and liquefies the vapor refrigerant into a liquid refrigerant. This condenser 20 is provided on one surface side of the panel exposed to sunlight. Here, in the present embodiment, the second portion P2 on the one surface side of the panel corresponding to the condenser 20 is subjected to processing so as to have a solar reflectance of 80% or more, and more preferably, is subjected to processing so as to have a solar reflectance of 80% or more and a far-infrared emissivity of 80% or more (refer to FIG. 1A). Through such processing, the condenser 20 is maintained in a temperature range of, for example, about 40° C. to 50° C. during the day, and can condense the vapor refrigerant. White enamel processing is an example of the above-described processing capable of obtaining the solar reflectance of 80% or more and the far-infrared emissivity of 80% or more, and in the present embodiment, the second portion P2 is subjected to the white enamel processing.

Particularly, in the present embodiment, a black enamel and a white enamel are applied to one surface side which becomes the same surface of the main body portion 1a. Therefore, both black and white enamel glazes are applied to one surface side and then simultaneously fired, thereby making it possible to perform two types of processing.

The liquid refrigerant flow path R2 is a flow path that connects the condenser 20 to the evaporator 30. In the example shown in FIGS. 1A and 1B, the liquid refrigerant flow path R2 is provided so as to be exposed to the outside from the panel-shaped main body portion 1a, but is not limited thereto. The liquid refrigerant flow path R2 may be housed and provided in the main body portion 1a.

Figure 3A:
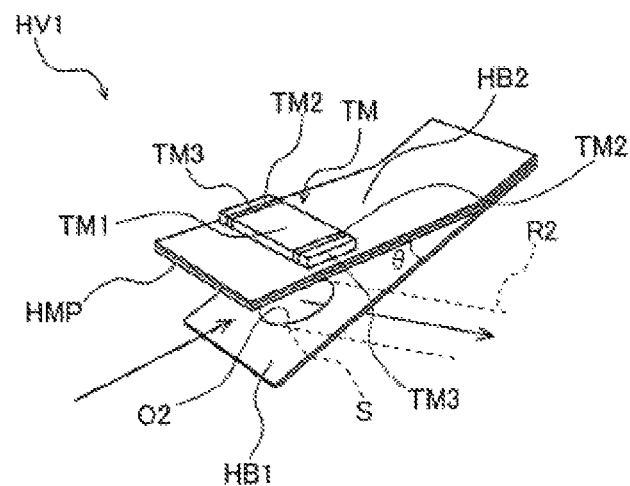
FIGS. 3A and 3B are configuration diagrams showing details of a first temperature control valve shown in FIGS. 1A and 1B.
Figure 3B:
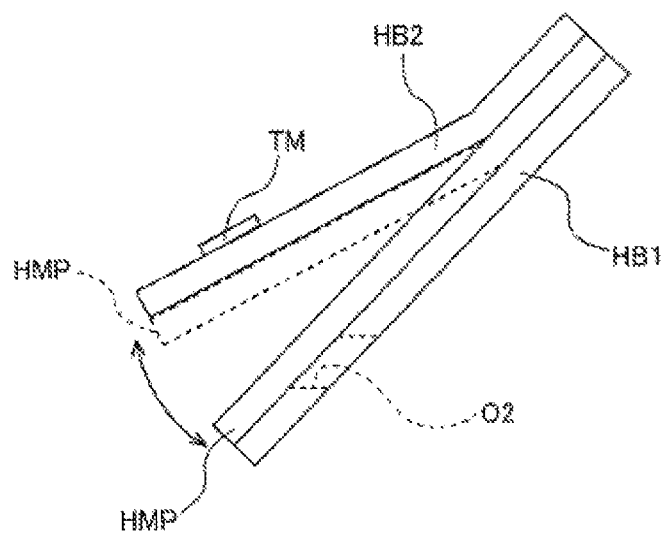

The first temperature control valve HV1 is a valve that is opened and closed depending on the ambient temperature, and is provided for the liquid refrigerant flow path R2. FIGS. 3A and 3B are configuration diagrams showing the details of the first temperature control valve HV1 shown in FIGS. 1A and 1B, FIG. 3A shows a perspective view, and FIG. 3B shows a side view. It is noted that, in FIG. 3B, for the sake of illustration, a plate material is illustrated to be thicker than that of FIG. 3A.

As shown in FIGS. 3A and 3B, the first temperature control valve HV1 is provided, for example, so as to be able to open and close a starting end S (upstream end) of the liquid refrigerant flow path R2, and includes two base materials HB1 and HB2, a temperature magnet TM, and an operation plate HMP.

The two base materials HB1 and HB2 are plate materials in a state of being separated from each other by rotation at an angle θ. In the two base materials HB1 and HB2, the first base material HB1 is formed with an opening O2 having a size corresponding to the diameter of the liquid refrigerant flow path R2, and the opening O2 is in a state of being connected to the starting end S of the liquid refrigerant flow path R2. The second base material HB2 is a plate material without an opening. It is noted that the second base material HB2 may have an opening or the like.

The temperature magnet TM is provided on the second base material HB2, and is formed of a permanent magnet TM1, a temperature-sensitive ferrite TM2, and a soft iron yoke TM3. The temperature-sensitive ferrite TM2 becomes a non-magnetic body at the Curie temperature (specific temperature (for example, 40° C.)) or higher, and becomes a magnetic body below the Curie temperature. This temperature-sensitive ferrite TM2 is interposed between the permanent magnet TM1 and the soft iron yoke TM3. Therefore, the temperature magnet TM causes a magnetic force thereof to act on the surroundings when the temperature is lower than the specific temperature, and does not cause the magnetic force to act on the surroundings when the temperature reaches the specific temperature or higher.

The operation plate HMP is a plate material made of a magnetic body, and is in a state of contacting the first base material HB1 and closing the starting end S of the liquid refrigerant flow path R2 in its basic state. Here, since the temperature inside the condenser 20 is maintained at 40° C. or higher during the day, the temperature magnet TM does not exert a magnetic force. Therefore, the operation plate HMP is in a state of contacting the first base material HB1 and closing the liquid refrigerant flow path R2. On the other hand, since the temperature inside the condenser 20 drops below 40° C. at night, the temperature magnet TM causes a magnetic force thereof to act on the surroundings. Therefore, the operation plate HMP made of the magnetic body is separated from the first base material HB1, and as such the liquid refrigerant flow path R2 is in the state of being opened.

The second check valve (first vapor refrigerant check valve) V2 is provided in the liquid refrigerant flow path R2 and prevents a vapor refrigerant from flowing backwards from the evaporator 30 into the condenser 20 (refer to FIG. 1B). The second check valve V2 is similar to the first check valve V1, and is provided so as to be able to open and close the terminal end of the liquid refrigerant flow path R2. The second check valve V2 includes two base material and an operation plate, and is configured to be opened and closed depending on a pressure difference.

The evaporator 30 is provided on the other surface side (indoor side) that is not exposed to sunlight, and evaporates the liquid refrigerant from the condenser 20 to take away evaporation heat from the other surface side of the panel, thereby performing a cooling effect. The inside of the evaporator 30 is, for example, in a vacuum state, so that even if a liquid refrigerant is at room temperature, the liquid refrigerant can evaporate. Therefore, the liquid refrigerant from the condenser 20 evaporates in the evaporator 30 and cools the other surface side.

The second vapor refrigerant flow path (vapor refrigerant flow path) R3 is a flow path that connects the evaporator 30 to the regenerative absorber 10. In the example shown in FIGS. 1A and 1B, the second vapor refrigerant flow path R3 is provided so as to be exposed to the outside from the panel-shaped main body portion 1a, but is not limited thereto. The second vapor refrigerant flow path R3 may be housed and provided in the main body portion 1a.

The second temperature control valve HV2 is a valve that is opened and closed depending on the ambient temperature, and is provided in the second vapor refrigerant flow path R3. The second temperature control valve HV2 is the same as the first temperature control valve HV1, and, for example, is provided so as to be able to open and close the starting end of the second vapor refrigerant flow path R3. The second temperature control valve HV2 includes two base materials, a temperature magnet, and an operation plate. The two base materials, the temperature magnet, and the operation plate are the same as those of the first temperature control valve HV1, but a combination of the Curie temperature of the temperature-sensitive ferrite and the permanent magnet, the temperature-sensitive ferrite, and the soft iron yoke is different. That is, the Curie temperature of the temperature-sensitive ferrite in the second temperature control valve HV2 is set to about 23° C. (specific temperature). The second temperature control valve HV2 opens the second vapor refrigerant flow path R3 when the ambient temperature is 23° C. or higher, and closes the second vapor refrigerant flow path R3 when the ambient temperature is below 23° C.

The third check valve (second vapor refrigerant check valve) V3 is provided in the second vapor refrigerant flow path R3 and prevents a vapor refrigerant from flowing backwards from the regenerative absorber 10 into the evaporator 30. This third check valve V3 is similar to the first check valve V1, and is provided to so as to be able to open and close the terminal end of the second vapor refrigerant flow path R3. This third check valve V3 includes two base materials and an operation plate, and is configured to be opened and closed depending on a pressure difference.

It is noted that the above description assumes the tubular flow paths R1 to R3, but any one or more of the flow paths R1 to R3 may not be a tubular shape, and may be simply configured to secure a passage for a vapor refrigerant or a liquid refrigerant.

The latent heat storage material 40 has a phase change temperature (melting point and freezing point) within a specific temperature range (for example, about 23° C.). In the present embodiment, the latent heat storage material 40 is provided farther on the other surface side of the panel than the evaporator 30. For this reason, for example, in a case where the air-conditioning panel 1 is used as a building material, when the room temperature is equal to or higher than the specific temperature range, the room is cooled by the latent heat storage material 40, and as such the evaporator 30 functions as a device that takes away heat from the latent heat storage material 40 and solidifies the heat.

The heat insulating cover 50 is a light-transmissive film material that covers the first portion P1, and corresponds to, for example, an ethylene tetra fluoro ethylene (ETFE) film. By providing the heat insulating cover 50, the first portion P1 can easily maintain a high temperature state, thereby making it possible to efficiently perform regeneration by the regenerative absorber 10.

Next, a description will be given as to the operation of the air-conditioning panel 1 according to the present embodiment from day to evening.

First, it is assumed that one panel surface side of the air-conditioning panel 1 is exposed to sunlight during the day. In the present embodiment, a black enamel is applied to the first portion P1 corresponding to the regenerative absorber 10, and a solar absorptivity is set to 80% or more. In addition, since the first portion P1 is provided with the heat insulating cover 50, the regenerative absorber 10 is heated to, for example, 100° C. or higher, so that an absorbent liquid and an adsorbent agent in the regenerative absorber 10 discharge a vapor refrigerant. The discharge of the vapor refrigerant increases pressure in the regenerative absorber 10 and generates a pressure difference between the regenerative absorber 10 and the condenser 20. When the pressure difference therebetween occurs, the first check valve V1 provided in the first vapor refrigerant flow path R1 becomes in an open state, and as such the vapor refrigerant passes through the first vapor refrigerant flow path R1 and reaches the condenser 20.

In the condenser 20, even if one surface side of the panel of the air-conditioning panel 1 is exposed to sunlight during the day, a white enamel is applied to the second portion P2, thereby obtaining a solar reflectance of 80% or more and a far-infrared emissivity of 80% or more. Therefore, the inside of the condenser 20 is maintained at about 40° C. to 50° C. Accordingly, the vapor refrigerant from the regenerative absorber 10 is liquefied in the condenser 20 and becomes a liquid refrigerant.

Here, since the temperature inside the condenser 20 does not drop below 40° C. during the day, the first temperature control valve HV1 maintains a closed state. Therefore, the liquid refrigerant is accumulated in the condenser 20 without moving to the evaporator 30. In addition, since regeneration is performed in the regenerative absorber 10 during the day, the third check valve V3 is closed due to a high pressure in the regenerative absorber 10, and the evaporator 30 becomes in a non-functioning state.

As described above, regeneration is performed in the regenerative absorber 10 during the day, and the liquid refrigerant is accumulated in the condenser 20. It is noted that, when the room temperature is 23° C. or higher during the day, the interior of a room is cooled by the latent heat storage material 40.

Further, in the evening, when sunlight stops shining, regeneration in the regenerative absorber 10 stops, and the high-temperature vapor refrigerant does not flow into the condenser 20. Accordingly, the temperature of the condenser 20 is lowered. When the temperature of the condenser 20 drops to 40° C., the first temperature control valve HV1 of the liquid refrigerant flow path R2 is opened. Further, at this time, since the temperature of the evaporator 30 is lowered, pressure is also lowered. Therefore, the second check valve V2 is also opened, and the liquid refrigerant moves to the evaporator 30.

Next, a description will be given as to the nighttime operation of the air-conditioning panel 1 according to the present embodiment.

First, the inside of the evaporator 30 is in a vacuum state. Therefore, the liquid refrigerant in the evaporator 30 evaporates at night. Here, when the latent heat storage material 40 is in a molten state at night, the second temperature control valve HV2 is in an open state. In addition, since one surface side of the panel is not exposed to sunlight at night, there is no evaporation in the regenerative absorber 10 and the pressure in the evaporator 30 is higher than that in the regenerative absorber 10. Therefore, the third check valve V3 is also in an open state, and the vapor refrigerant generated in the evaporator 30 reaches the regenerative absorber 10.

The vapor refrigerant that has reached the regenerative absorber 10 is absorbed by an absorbent liquid or an adsorbent agent in the regenerative absorber 10. Here, a black enamel is applied to the first portion P1, and a far-infrared emissivity is set to 80% or more. Therefore, absorbed heat is suitably discharged.

Particularly at night, the latent heat storage material 40 is cooled by evaporation in the evaporator 30. Therefore, even if the latent heat storage material 40 is in a molten state during the day, the same will be in a solidified state again, and as such a cooling effect to the indoor side will be restored.

At night, the pressure of the evaporator 30 becomes higher than that of the condenser 20 due to evaporation by the evaporator 30 at night. Therefore, the second check valve V2 becomes in a closed state, thereby preventing the vapor refrigerant from flowing backwards from the evaporator 30 into the condenser 20.

Particularly, heat transfer from the latent heat storage material 40 to the liquid refrigerant, which is a liquid, is much faster than heat transfer from the indoor air to the latent heat storage material 40. Therefore, even if the latent heat storage material 40 capable of cooling the interior of a room for several days is mounted on the air-conditioning panel 1, when evaporation is performed in the evaporator 30 for several hours at night, almost all of the latent heat storage material 40 returns to a solid state.

As described above, since the air-conditioning panel 1 according to the present embodiment includes the regenerative absorber 10 having an absorbent liquid or an adsorbent agent that absorbs a vapor refrigerant and discharging the vapor refrigerant by being exposed to sunlight, the air-conditioning panel 1 can perform regeneration by being exposed to sunlight and perform absorption when not exposed to sunlight, and as such a limited area can be effectively utilized without separately providing a regenerator and an absorber. Further, the regenerative absorber 10 and the condenser 20 are formed on one surface side of the panel, which is exposed to sunlight, and the evaporator 30 is formed on the other surface side of the panel, which is opposite to the one surface side of the panel, thereby making it possible not only to prevent reduction in the area of the evaporator 30 due to existence of the condenser 20, but also to prevent deterioration in the air-conditioning effect due to discarding of condensation heat. In addition, although the regenerative absorber 10 and the condenser 20 are formed on one surface side of the panel, the one surface side being the side exposed to sunlight, the first portion P1 corresponding to the regenerative absorber 10 is subjected to processing so as to have a solar absorptivity of 80% or more and a far-infrared emissivity of 80% or more, and the second portion P2 corresponding to the condenser 20 is subjected to processing so as to have a solar reflectance of 80% or more, thereby making it possible to achieve a configuration in which regeneration and absorption are performed in the regenerative absorber 10, and deterioration in condensation efficiency in the condenser 20 is suppressed. Therefore, it is possible to solve the problem related to area occupancy and to execute more sufficient performance.

In addition, since a black enamel is formed in the first portion P1, a solar absorptivity of 80% or more and a far-infrared emissivity of 80% or more can be achieved by enamel processing.

Further, since a white enamel is formed in the second portion P2, a solar reflectance of 80% or more can be achieved by enamel processing.

Particularly, after black and white enamel glazes are respectively applied to both the first portion P1 and the second portion P2, the first and second portions P1 and P2 can be formed by simultaneous firing, which can contribute to simplification of a manufacturing process.

Additionally, since the second check valve V2 is provided to prevent a vapor refrigerant from flowing backwards from the evaporator 30 into the condenser 20, it is possible to prevent the vapor refrigerant generated in the evaporator 30 from returning to the condenser 20 at night and to appropriately send the vapor refrigerant to the regenerative absorber 10. Therefore, it is possible to contribute to performing an appropriate air-conditioning operation.

In addition, since the third check valve V3 is provided to prevent a vapor refrigerant from flowing backwards from the regenerative absorber 10 into the evaporator 30, it is possible to prevent the vapor refrigerant generated in the regenerative absorber 10 from moving to the evaporator 30 during the time at which the regenerative absorber 10 is exposed to sunlight during the day and to appropriately send the vapor refrigerant to the condenser 20. Therefore, it is possible to contribute to performing an appropriate air-conditioning operation.

Although the present invention has been described above based on the embodiments, the present invention is not limited to the above-described embodiments. Modifications may be made without departing from the gist of the present invention, and a public or well-known technique may be combined to the extent possible.

For example, although the latent heat storage material 40 is provided in the embodiment, the latent heat storage material 40 may not be provided when a cooling effect is desired to be achieved only at night.

In addition, although the first and second temperature control valves HV1 and HV2 using the temperature magnet TM are provided in the present embodiment, the present disclosure is not limited thereto. A temperature sensor and a control unit may be further provided, and the first and second temperature control valves HV1 and HV2 may be opened and closed by the control unit according to the temperature detected by the temperature sensor.

Various embodiments have been described above with reference to the drawings, but it goes without saying that the present disclosure is not limited to such examples. It is clear that a person skilled in the art can come up with various modifications or corrections within the scope described in the claims, and it is naturally understood that those modifications and corrections also belong to the technical scope of the present disclosure. Further, the components in the above-described embodiments may be freely and selectively combined without departing from the gist of the present disclosure.

What is claimed is:

1. An air-conditioning panel formed in a panel shape and configured to obtain an air-conditioning effect, the air-conditioning panel comprising:
    a regenerative absorber having an absorbent liquid that absorbs a vapor refrigerant or an adsorbent agent that adsorbs the vapor refrigerant, wherein the regenerative absorber discharges the vapor refrigerant absorbed or adsorbed by heating with sunlight;
    a condenser configured to liquefy the vapor refrigerant discharged from the regenerative absorber into a liquid refrigerant; and
    an evaporator configured to evaporate the liquid refrigerant from the condenser,
    wherein the regenerative absorber and the condenser are formed on one surface side of the panel, wherein the one surface side is a side being exposed to sunlight,
    wherein the evaporator is formed on the other surface side of the panel, wherein the other surface side is opposite the one surface side of the panel,
    wherein a first portion on the one surface side of the panel, the first portion corresponding to the regenerative absorber has a solar absorptivity of 80% or more and a far-infrared emissivity of 80% or more, and
    wherein a second portion on the one surface side of the panel, the second portion corresponding to the condenser has a solar reflectance of 80% or more.

2. The air-conditioning panel according to claim 1, wherein the first portion has a black enamel formed therein.

3. The air-conditioning panel according to claim 1, wherein the second portion has a white enamel formed therein.

4. The air-conditioning panel according to claim 1, further comprising:
    a liquid refrigerant flow path configured to feed the liquid refrigerant liquefied in the condenser to the evaporator; and
    a first vapor refrigerant check valve provided in the liquid refrigerant flow path and configured to prevent the vapor refrigerant from flowing backwards from the evaporator into the condenser.

5. The air-conditioning panel according to claim 1, further comprising:
    a vapor refrigerant flow path configured to feed the vapor refrigerant evaporated in the evaporator to the regenerative absorber; and
    a second vapor refrigerant check valve provided in the vapor refrigerant flow path and configured to prevent the vapor refrigerant from flowing backwards from the regenerative absorber into the evaporator.

\* \* \* \* \*